US00RE36122E

United States Patent [19]

Mattes et al.

[11] E Patent Number: Re. 36,122

[45] Reissued Date of Patent: Mar. 2, 1999

[54] METHOD FOR CONTROLLING THE RELEASE OF PASSENGER RESTRAINT SYSTEMS

[75] Inventors: Bernhard Mattes, Sachsenheim; Werner Nitschke, Ditzingen; Willi Kühn, Markgröningen; Wolfgang Drobny, Besigheim; Hugo Weller, Beilstein; Peter Taufer, Renningen, all of Germany; Edmund Jeenicke, Luxembourg, Luxembourg; Klaus Reischle, Ditzingen-Schockingen, Germany; Michael Henne, Altdorf, Germany; Wilfried Burger, Hemmingen, Germany

[73] Assignee: Robert Bosch GmbH, Stuttgart, Germany

[21] Appl. No.: 797,385

[22] Filed: Feb. 7, 1997

Related U.S. Patent Documents

Reissue of:

[64] Patent No.: 5,014,810
Issued: May 14, 1991
Appl. No.: 458,239
Filed: Dec. 28, 1989

U.S. Applications:

[63] Continuation of Ser. No. 516,730, Aug. 18, 1995, abandoned, which is a continuation of Ser. No. 300,094, Sep. 1, 1994, abandoned, which is a continuation of Ser. No. 999,030, Dec. 31, 1992, abandoned.

[30] Foreign Application Priority Data

Feb. 18, 1989 [DE] Germany ..... 39 05 052.1
Jul. 25, 1989 [DE] Germany ..... 39 24 507.1

[51] Int. Cl.[6] ..... B60R 21/00

[52] U.S. Cl. ..... 180/268; 280/802; 280/806

[58] Field of Search ..... 280/728.1, 731, 280/735, 801.1, 802, 806; 180/282, 268, 269, 270; 307/10.1

[56] References Cited

U.S. PATENT DOCUMENTS 3,870,894 3/1975 Brede et al. .
3,889,232 6/1975 Bell .
3,911,391 10/1975 Held et al. ..... 280/735

(List continued on next page.)

FOREIGN PATENT DOCUMENTS 0292669 11/1968 European Pat. Off. .
0064888 11/1982 European Pat. Off. .
0342401 11/1989 European Pat. Off. .
2139944 1/1973 France .
2184307 12/1973 France .
2123359 1/1972 Germany .
2240389 3/1973 Germany .
3816588 11/1989 Germany .
WO88/00146 1/1988 WIPO .

OTHER PUBLICATIONS

1141 Ingenieurs de l'Automobile (1982), No. 6 Paris, France pp. 69–77, W. Suchowerskyj.

Dr. Luigi Brambilla, Mercedes–Benz AG, Sindelfingen Article entitled "Das zentrale Auslosegerat fur automatische Ruckhaltesysteme: Bewahrte und okonomische Losung zur Sensierung der Unfallschwere und zur System-buerwachung", pp. 15–1 –15–18 (with English Translation).

*Primary Examiner*—Kenneth R. Rice
*Attorney, Agent, or Firm*—Kenyon & Kenyon

[57] ABSTRACT

In a method for controlling the release of a passenger restraint system in a vehicle, an acceleration signal is measured and integrated with respect to time to obtain a velocity signal. A release threshold value for the velocity signal is determined. If the velocity signal then falls below the release threshold value, thus indicating a vehicle collision, the passenger restraint system is released. The release threshold value is controlled depending on the type of accident situation and upon the operating parameters of the vehicle to increase the release sensitivity of the passenger restraint system. For example, the release threshold value is adjusted based on the value of the velocity signal. If the velocity signal decreases in value, then the release threshold is lowered to a more sensitive value.

48 Claims, 11 Drawing Sheets

U.S. PATENT DOCUMENTS

| | | | |
|---|---|---|---|
| 3,963,090 | 6/1976 | Hollins | 180/268 |
| 4,020,453 | 4/1977 | Spies et al. . | |
| 4,021,057 | 5/1977 | Held et al. | 280/735 |
| 4,117,730 | 10/1978 | Spies et al. . | |
| 4,164,263 | 8/1979 | Heintz et al. | 280/735 |
| 4,189,022 | 2/1980 | Lazich et al. | 180/268 |
| 4,410,875 | 10/1983 | Spies et al. | 280/735 |
| 4,553,625 | 11/1985 | Tsuge et al. | 180/268 |
| 4,638,179 | 1/1987 | Mahes et al. | 280/735 |
| 4,742,886 | 5/1988 | Sato | 180/268 |
| 4,784,237 | 11/1988 | Condne et al. | 180/268 |
| 4,902,039 | 2/1990 | Kawai | 180/268 |
| 5,068,793 | 11/1991 | Condne et al. | 280/735 |

METHOD FOR CONTROLLING THE RELEASE OF PASSENGER RESTRAINT SYSTEMS

Matter enclosed in heavy brackets [ ] appears in the original patent but forms no part of this reissue specification; matter printed in italics indicates the additions made by reissue.

*This application is a continuation of Reissue appliation Ser. No. 08/516,730 filed on Aug. 18, 1995 now abandoned which is, in turn, a continuation of Reissue application Ser. No. 08/300,094 filed on Sep. 1, 1994 now abandoned which is, in turn, a continuation of Reissue application Ser. No. 07/999,030 filed on Dec. 31, 1992 now abandoned.*

FIELD OF THE INVENTION

The present invention relates to passenger restraint systems for vehicles and, in particular, to methods of controlling the release of passenger restraint systems during vehicle operation.

BACKGROUND INFORMATION

A method for releasing a passenger restraint system is shown in 1141 Ingenieurs de l'Automobile (1982) No. 6, pages 69–72. Passenger restraint systems having one centrally located collision sensor perform relatively well in the event of a direct front end or rear end collision. However, such systems frequently encounter problems in collisions that occur at oblique angles with respect to the longitudinal axis of the vehicle. Oblique collisions, as opposed to direct front end or rear end collisions, commonly occur in city traffic. One problem experienced with oblique collisions, is that in spite of presenting an acute danger to the passengers, the passenger restraint system, such as a driver side air bag, is often released too late. As a result, the passenger may strike the steering wheel or dashboard of the vehicle before the air bag is released, thus negating the beneficial effects of the air bag and, indeed, possibly further injuring the passenger.

In German Patent No. DE-OS 22 40 389, a passenger restraint system is shown, which is provided to improve the responsiveness of the system to collisions occurring in an oblique direction, as compared to other passenger restraint systems. The system comprises two acceleration sensors that are oriented so that the sensitivity axes of the sensors are disposed at oblique angles with respect to the longitudinal axis of the vehicle. One disadvantage of this system, is that it is relatively expensive to manufacture and install the cabling for the sensors.

Other known passenger restraint systems comprise a plurality of sensors which are located in a decentralized arrangement on the vehicle. These systems likewise have high cabling expenses and, moreover, in the normal operation of the vehicle, they are very susceptible to disturbances. Other types of decentralized systems employ mechanical switches. However, the ability of mechanical switches to function properly during the operation of a motor vehicle in a collision cannot readily be checked.

SUMMARY OF THE INVENTION

The present invention is directed to a method of controlling the release of a passenger restraint system in a vehicle, comprising the following steps: generating a first signal indicative of the acceleration of the vehicle; integrating the first signal with respect to time to generate a second signal indicative of the velocity of the vehicle; determining a first threshold value and adjusting the first threshold value based on the value of the first signal; comparing the value of the second signal to the first threshold value, and releasing the passenger restraint system if the value of the second signal exceeds the first threshold value.

In one embodiment of the present invention, the first threshold value is decreased in response to an increase in the value of the second signal. Preferably, the first threshold value is decreased as a linear function of time. The method of the present invention further includes the step of determining a second threshold value, and decreasing the first threshold value approximately when the value of the second signal reaches or exceeds the second threshold value. The method still further includes the step of determining a third threshold value. The third threshold value is greater than the second threshold value, thus defining a range between the second and third threshold values. When the value of the second signal reaches the third threshold value, the first threshold value is maintained at a minimum value. Preferably, the third threshold value is increased linearly as a function of time about when the value of the second signal reaches the second threshold value.

In another embodiment of the present invention, about when the value of the second signal reaches the second threshold value, the first threshold value is decreased as a non-linear function of time, and is then maintained at a constant minimum value, approximately when the value of the second signal reaches the third threshold value. Preferably, the second threshold value is increased linearly as a function of time, approximately when the value of the second signal reaches the second threshold value.

In another embodiment of the present invention, the second threshold value, which is less than the first threshold value, is maintained constant as a function of time. Then, about when the value of the second signal reaches the second threshold value, the first threshold value is maintained at a constant value. A first time interval is measured from about when the value of the second signal reaches the second threshold value. If the value of the second signal does not reach the first threshold value within the first time interval, the first threshold value is increased to a higher value. If the value of the second signal then decreases back to the second threshold value, the first threshold value is decreased to its initial lower value.

In another embodiment of the present invention, when the value of the second signal increases, the first threshold value is decreased to a lower value for a first time interval. At the end of the first time interval, the first threshold value is increased to its initial higher value. Preferably, the first threshold value is decreased to a greater degree for larger increases in the value of the second signal per unit of time.

In another embodiment of the present invention, the slope of a curve corresponding to the values of at least two first signals plotted with respect to time is determined. The first threshold value is then controlled based on the slope of the curve.

In yet another embodiment of the present invention, a second time interval is measured when the value of the second signal increases. The first threshold value is maintained constant during the second time interval. The first threshold value is then decreased at the end of the second time interval, if the value of the second signal is greater than it was prior to the initiation of the second time interval.

The present invention is also directed to a method of controlling the release of a passenger restraint system in a vehicle, comprising the following steps: generating a first reference signal indicative of the acceleration of the vehicle; integrating the first reference signal with respect to time to generate a second reference signal indicative of the velocity of the vehicle; comparing the second reference signal to a lower reference threshold value and to an upper reference threshold value, wherein the lower and upper reference threshold values define a reference integrator range therebetween; when the value of the second reference signal reaches the lower reference threshold, measuring the time elapsed while the value of the second reference signal is within the reference integrator range; generating a first release signal indicative of the acceleration of the vehicle; adjusting the first release signal based on the measured time elapsed while the value of the second reference signal is within the reference integrator range; integrating the adjusted first release signal with respect to time to obtain a second release signal; comparing the value of the second release signal to a release threshold value, and releasing the passenger restraint system if the value of the second release signal equals or exceeds the release threshold value.

In one embodiment of the present invention, the first release signal is increased as a function of time when the value of the second reference signal is within the reference integrator range. Preferably, the value of the second release signal is increased exponentially as a function of time. Also, about when the value of the second release signal equals or exceeds the release threshold value, the value of the second reference signal should equal or exceed the upper reference threshold value, thus releasing the passenger restraint system.

One advantage of the method of the present invention, is that by adjusting the first or release threshold value based on the value of the first signal, the release threshold value can be lowered while the integrated acceleration signals gradually increase. Thus, when the integrated acceleration signals reach a level that is sufficiently dangerous to the passengrs, the restraint system can be rapidly released because the release threshold value is maintained relatively close to the integrated acceleration values. Therefore, during oblique impact collisions, where the acceleration signals usually increase more gradually than with direct front end or rear end collisions, a passenger restraint system can be rapidly and accurately released.

Other advantages of the method of the present invention will become apparent in view of the following detailed description and drawings taken in connection therewith.

DETAILED DESCRIPTION

Figure 1:
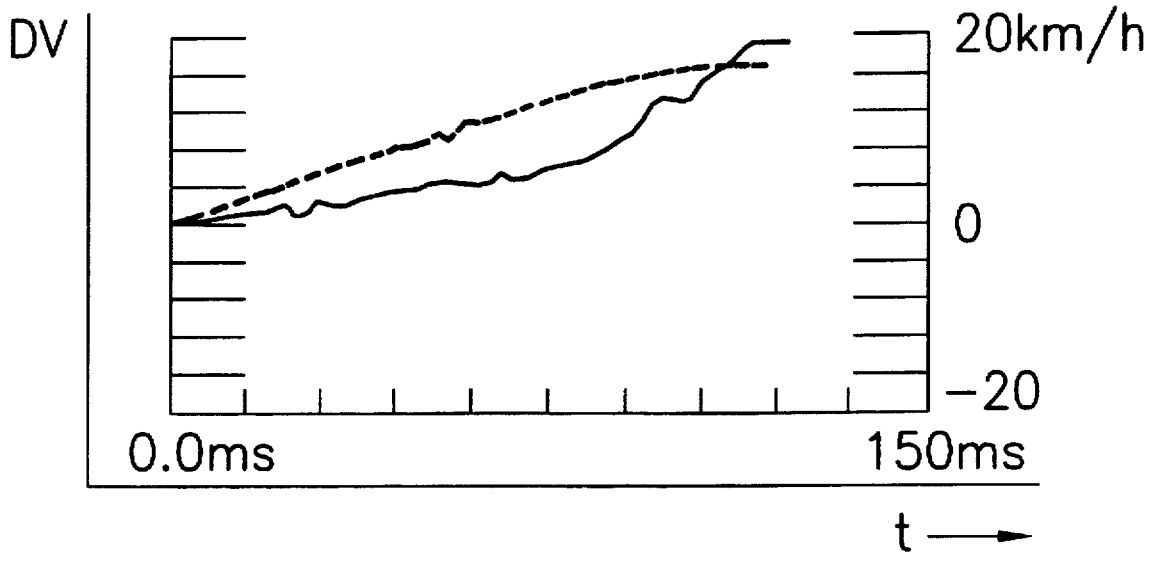
FIG. 1 illustrates two typical curves corresponding to the decrease in velocity of vehicles during traffic collisions.

In FIG. 1, two curves are shown illustrating the decrease in velocity (DV) of a vehicle over time occurring, for example, during a collision in a traffic accident. The decrease in velocity curves are obtained by integrating the acceleration or, that is, the deceleration of the vehicle as detected by an acceleration sensor, such as a pick-up type acceleration sensor, mounted on the vehicle. The dotted line in FIG. 1 corresponds to a collision in the direction of the longitudinal axis of the vehicle, such as a direct front end or direct rear end collision. As can be seen, during a time period of about 120 ms, from the beginning to the end of the collision, there is a decrease in velocity (DV) of about 14.3 km per hour. Therefore, the collision represented by the dotted line in FIG. 1 usually would not represent a significant danger to the passengers, and thus the passenger restraint system, such as an air bag, would not be released.

The solid line in FIG. 1, on the other hand, corresponds to a typical oblique collision, wherein the impact angle is about 30° with respect to the longitudinal axis of the vehicle. As can be seen, there is a decrease in velocity (DV) during a 120 ms time period, from the beginning to the end of the collision, of about 20 km per hour. However, more importantly, the decrease in velocity occurs more rapidly than in the collision corresponding to the dotted line curve. Such a speed change would generally present an acute danger to the passengers, and thus should give rise to a release of the passenger restraint system. However, one problem with known passenger restraint systems, is that during oblique collisions, the determination as to the danger of the situation, which is based on the output signals of an acceleration sensor, is made too late, frequently because the acceleration sensors are only effective in the direction of the longitudinal axis of the vehicle. As a result, if the release of the passenger restraint system is delayed, the system may not effectively protect the passengers.

Figure 2:
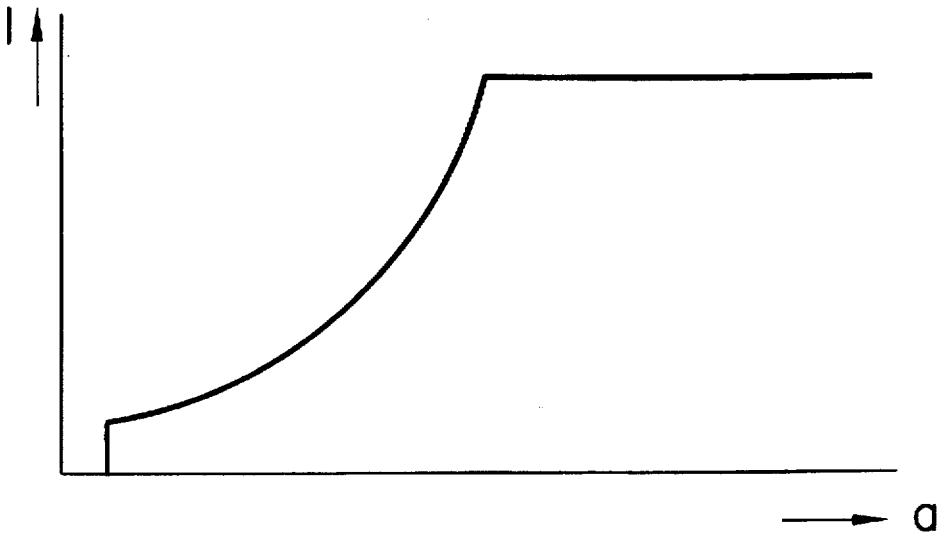
FIG. 2 illustrates a typical integration curve generated by an integration device (DV integrator) as a function of the acceleration values generated by an acceleration sensor.

Under the method of the present invention, an integration device referred to as a "DV integrator" is used to control the release of a passenger restraint system. The DV integrator integrates the signals generated by an acceleration sensor mounted on the vehicle. The signals generated by the acceleration sensor are indicative of the rate of the decrease in velocity, or the deceleration of the vehicle. In FIG. 2, a graph illustrates a typical integration value curve (I) generated by a DV integrator as a function of the acceleration values (A) of an acceleration sensor.

It is recognized in practising the present invention that overproportional weighting of large acceleration values based on certain characteristics, for example, by quadratic weighting of large amplitude acceleration signals, the signals can be integrated more rapidly than would be the case in a system that proportionally weighs the signals. Thus, in the event of a rapidly occurring collision generating relatively large amplitude acceleration signals, the DV integrator integrates the acceleration values rapidly. As a result, a rapid release of the passenger restraint system, such as an air bag, can take place, in order to effectively protect the passengers in a rapidly occurring collision.

Pursuant to the method of the present invention, a passenger restraint system is activated when the integrated output signal of a DV integrator, or the DV integration value, exceeds a threshold value, which is referred to as the "DV threshold". The integrated output signal represents the decrease in velocity or deceleration of the vehicle from the beginning of the collision. The time required by the DV integrator to reach the DV threshold is also taken into consideration, in order to rapidly and thus effectively release passenger restraint systems during collisions.

In accordance with one embodiment of the method of the present invention, if the value of the DV integration is between two integration values, which define a DV integrator range, then the DV threshold value is lowered to increase the release sensitivity of the passenger restraint system. The DV integrator range can be maintained at a constant value over time, or can be varied. Likewise, the DV integrator range can be varied as a function of time, as a function of the DV threshold, and/or as a function of the DV integration values.

Figure 3:
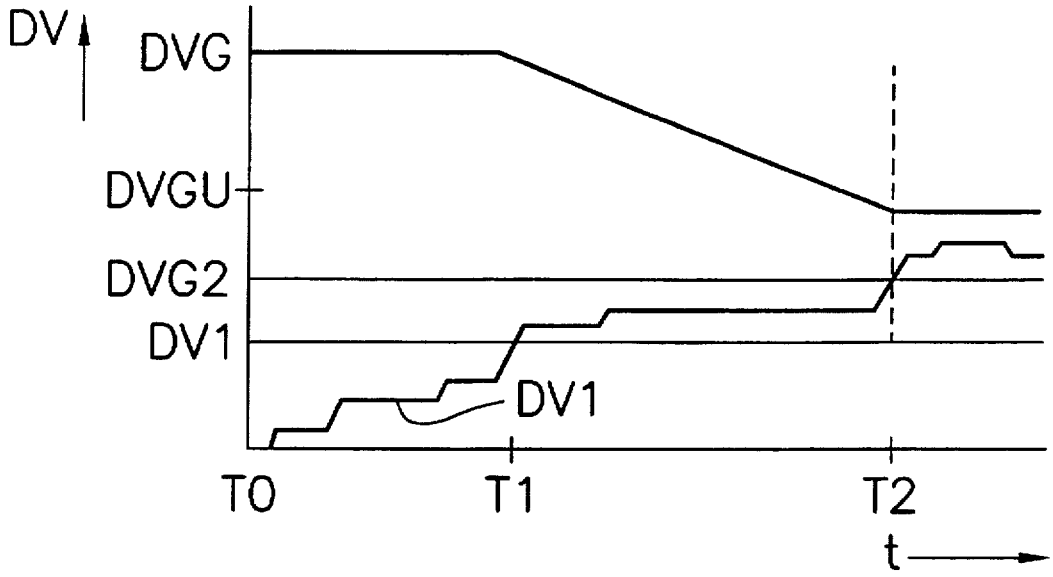
FIG. 3 illustrates one embodiment of the method of the present invention for controlling a passenger restraint system in response to a DV integration curve corresponding to a typical oblique impact collision.

In FIG. 3, one embodiment of the method of the present invention is illustrated, wherein a DV integration curve (DVI) corresponding to a typical oblique impact collision is illustrated. The DV integrator range is maintained at a constant level and value with respect to time, and extends between the values DV1 and DV2. At time TO, the initial or basic DV threshold (DVG) is set at a relatively high value in comparison to the value of the DV integration (DVI). However, when the DV integration (DVI) increases and reaches the level DV1, the DV threshold (DVG) is lowered as a function of time. As the DVI continues to increase within the range DV1–DV2, the DV threshold (DVG) is decreased linearly with time, until it reaches a threshold value (DVGU) at time T2. The linear DVG curve from the point in time T1 to the point in time T2 is defined by the following equation:

$$\text{DV threshold}=\text{DVG}(1-p*t) \quad (1)$$

wherein p is a constant and t is the time.

Thus, as illustrated in FIG. 3 and defined by equation (1), the DV threshold (DVG) decreases linearly from time T1 until it reaches the threshold DVGU at time T2. After time T2, as the DVI reaches a value greater than the upper threshold DV2, or maintains a value between DV1 and DV2, the DV threshold (DVG) is maintained at the DVGU value. Then, if the DVI reaches the DVGU value, the passenger restraint system is released.

Therefore, according to the method of the present invention, the value of the DV integration (DVI) is evaluated within a range DV1–DV2 over a relatively long period of time, in such a way that the release readiness of the passenger restraint system, such as an air bag, is increased by lowering the DV threshold (DVG) from a relatively high value at time T0 to a lower value (DVGU) at time T2. Accordingly, because at time T2 the DV threshold (DVG) is maintained at a value relatively close to the increasing DV integration (DVI), the DVI will more rapidly reach the DV threshold (DVG), and thus the passenger restraint system can be released more rapidly than would be the case if the DVG were maintained at its initial higher value.

The method of the present invention is especially advantageous during oblique impact collisions, for example, collisions occurring at +10° to 30° with respect to the longitudinal axis of the vehicle. During oblique collisions, the DVI may increase more gradually, as shown in FIG. 3, then would be the case during a direct front end or rear end collision. Therefore, pursuant to the method of the present invention, while the DVI increases, the DVG is lowered gradually to the DVGU value, so that the passenger restraint system can be released rapidly once the DVI reaches that value. The method of the present invention, however, does not interfere with the response of the DV integrator in comparatively slow direct front end or direct rear end collisions, wherein a release of the passenger restraint system is not desired. Thus, when small and relatively brief periods of deceleration occur, the passenger restraint system should not be released.

Figure 4:
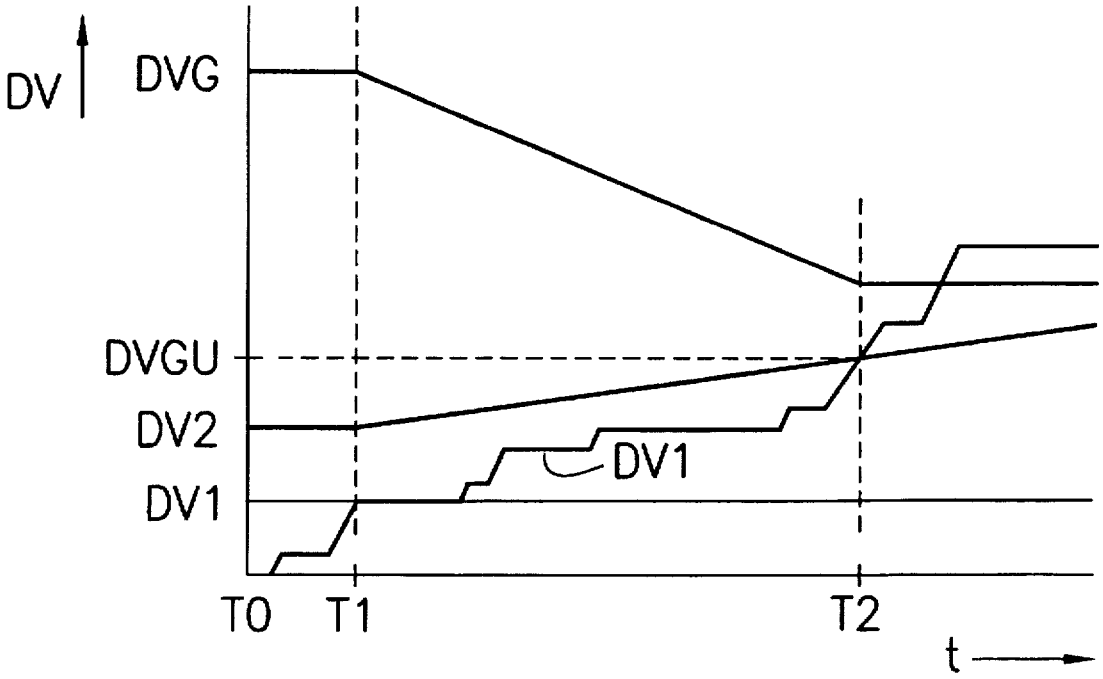
FIG. 4 illustrates another embodiment of the present invention for controlling a passenger restraint system in response to a typical oblique impact collision.

In FIG. 4, another embodiment of the method of the present invention is illustrated, wherein the range DV1–DV2 is expanded over time by increasing the value of the upper threshold DV2. The DVI curve illustrated is typical of an oblique impact collision. As can be seen, when the DVI reaches the lower threshold DV1 and continues to gradually increase thereafter, the upper threshold DV2 is increased linearly with time, and the DV threshold (DVG) is decreased linearly with time. At time T2, when the DVI reaches the DVGU value, the upper threshold DV2 continues to increase linearly with time above the value DVGU, and the DVG is maintained at a threshold value slightly above the DVGU value. When the DVI then reaches the DVG threshold value after time T2, the passenger restraint system is released. Thus, the method of the present invention considerably increases the release sensitivity of the passenger restraint system in response to a gradually increasing DVI curve, so that even in oblique impact collisions, an optimum release of the restraint system can be achieved to protect the passengers in the vehicle.

Figure 5:
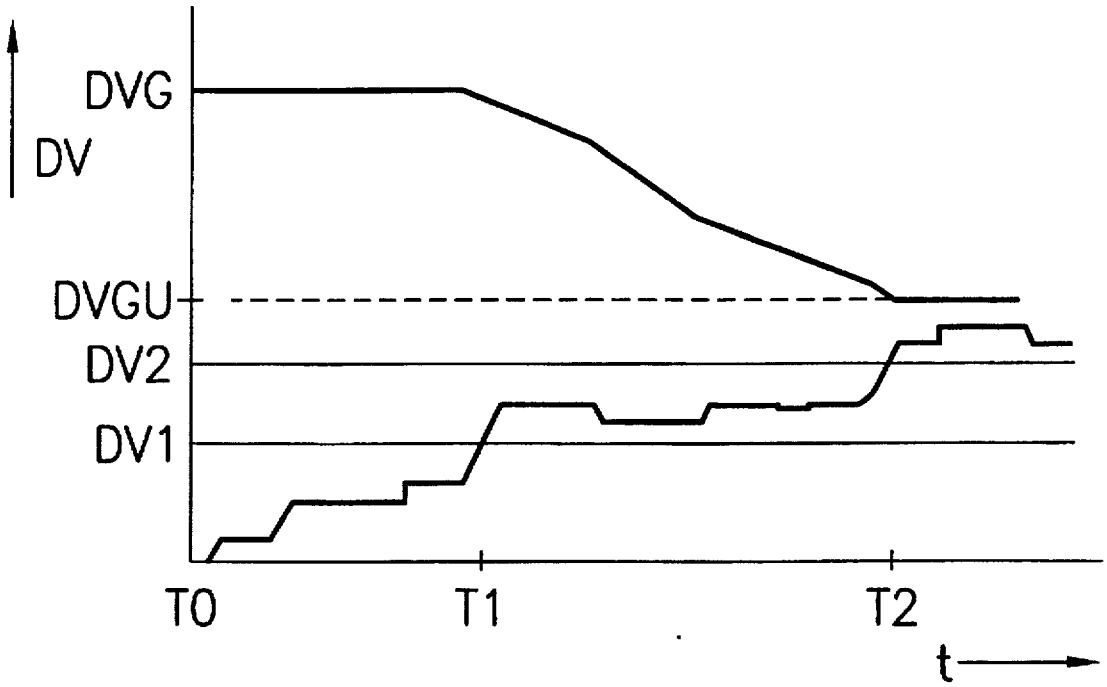
FIG. 5 illustrates another embodiment of the present invention for controlling a passenger restraint system in response to a typical oblique impact collision.

FIG. 5 illustrates another embodiment of the method of the present invention, wherein another DVI curve corresponding to a typical oblique impact collision is illustrated. At time T1, when the DVI exceeds the lower threshold DV1, the DV threshold (DVG) is decreased in response thereto over time. Thus, the DV threshold (DVG) is lowered as a function of both time and the value of the DV integration (DVI). The response behavior of the passenger restraint system is thus further refined. Then, when the DV integration (DVI) exceeds the upper threshold DV2 at time T2, the DV threshold (DVG) is lowered to a minimum DVGU value. As can be seen, the minimum DVGU value is close to both the upper threshold DV2 and the increasing DV integration value (DVI). Accordingly, the sensitivity of the passenger restraint system is increased so as to allow the system to be more rapidly released during a collision.

Figure 6:
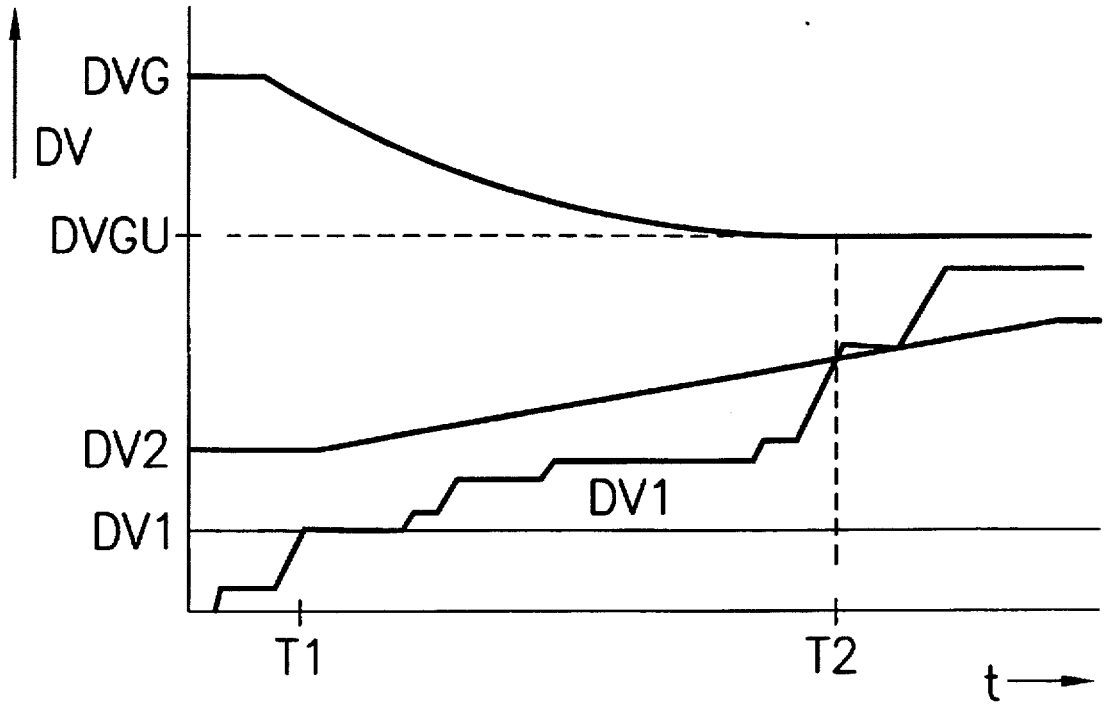
FIG. 6 illustrates another embodiment of the present invention for controlling a passenger restraint system in response to a typical oblique impact collision.

In FIG. 6, another embodiment of the method of the present invention is illustrated, wherein the DVI curve corresponds to a typical oblique impact collision. At time T1, when the DV integration (DVI) reaches and thereafter exceeds the lower threshold DV1, the upper threshold DV2 is increased with time, thus expanding the integrator range DV1–DV2. Likewise, at time T1, when the DVI reaches the lower threshold DVI, the DV threshold (DVG) is decreased with time in a non-linear manner. The DVG curve is defined approximately by the following equation:

$$\text{DV threshold}=(\text{DVI}/t*\text{Constant 1})+\text{Constant 2} \quad (2)$$

Then, when the DVI exceeds the upper threshold DV2 at time T2, the DV threshold (DVG) is maintained at its lowest value, DVGU. However, if the DV integration (DVI) thereafter falls below DVI, the DV threshold (DVG) is raised to its higher initial value prior to time T1. Likewise, if the DVI thereafter reaches the value DVGU, the passenger restraint system is released.

Figure 7:
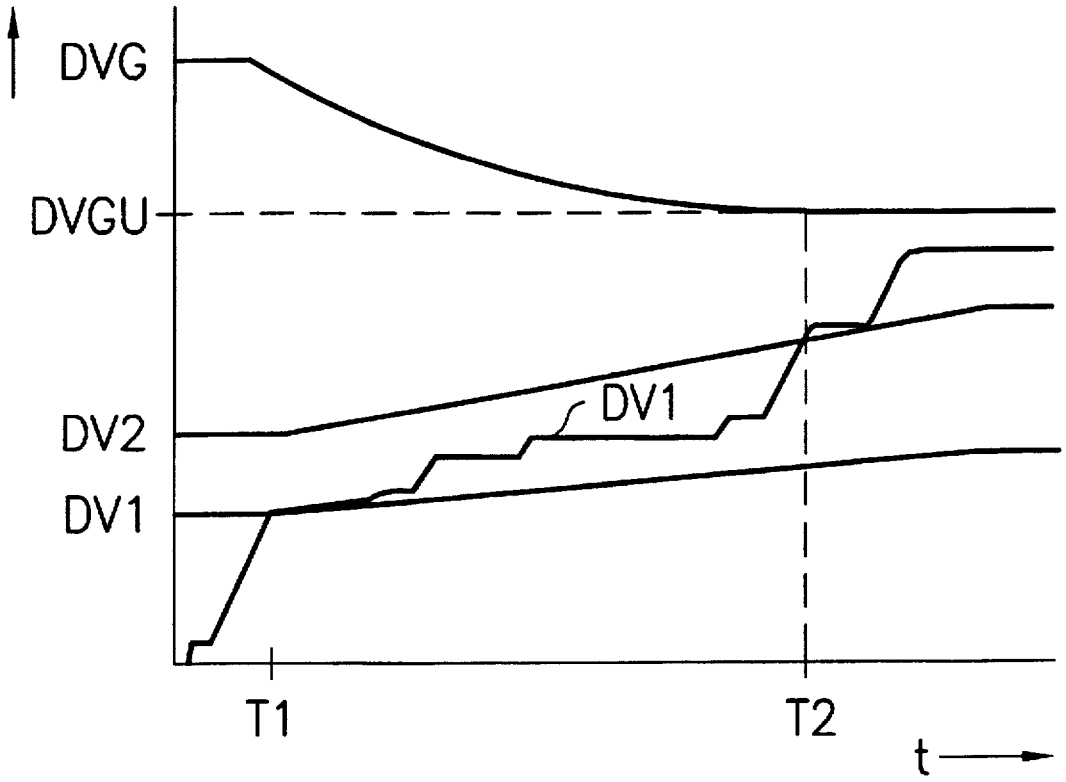
FIG. 7 illustrates another embodiment of the present invention for controlling a passenger restraint system in response to a typical oblique impact collision.

In FIG. 7, another embodiment of the method of the present invention is illustrated, wherein the DVI curve again corresponds to a typical oblique impact collision. At time T1, when the DV integration (DVI) reaches the lower threshold DV1, both the lower threshold DV1 and upper threshold DV2 are increased linearly as a function of time, so as to expand the integrator range DV1–DV2. The curve of the lower threshold DVI, beginning at time T1, is defined by the following equation:

$$\text{DV1}(t)=n(t)+\text{K2} \quad (3)$$

The curve of the upper threshold DV2, beginning at time T1, is likewise defined by the following equation:

$$\text{DV2}(t)=m(t)+\text{K1} \quad (4)$$

Thus, beginning at time T1, the values of DV1 and DV2 define increasing linear relationships with respect to time. In equations (3) and (4), m and n are the slopes of the straight line curves, respectively, and K1 and K2 are constants.

As further illustrated in FIG. 7, when the DVI reaches the lower threshold DV1, the DV threshold (DVG) is decreased in the same manner as described above in relation to FIG. 6 and defined in equation (2). Then, at time T2, when the DVI reaches the upper threshold DV2, the DV threshold is maintained at a minimum value DVGU. Thus, because after time T2, the DV threshold is maintained at the value DVGU, which is substantially close to the increasing DVI value, the release sensitivity of the passenger restraint is substantially refined in response to the unique problems of oblique collisions, in order to provide optimum protection for the passengers of the vehicle.

Figure 8:
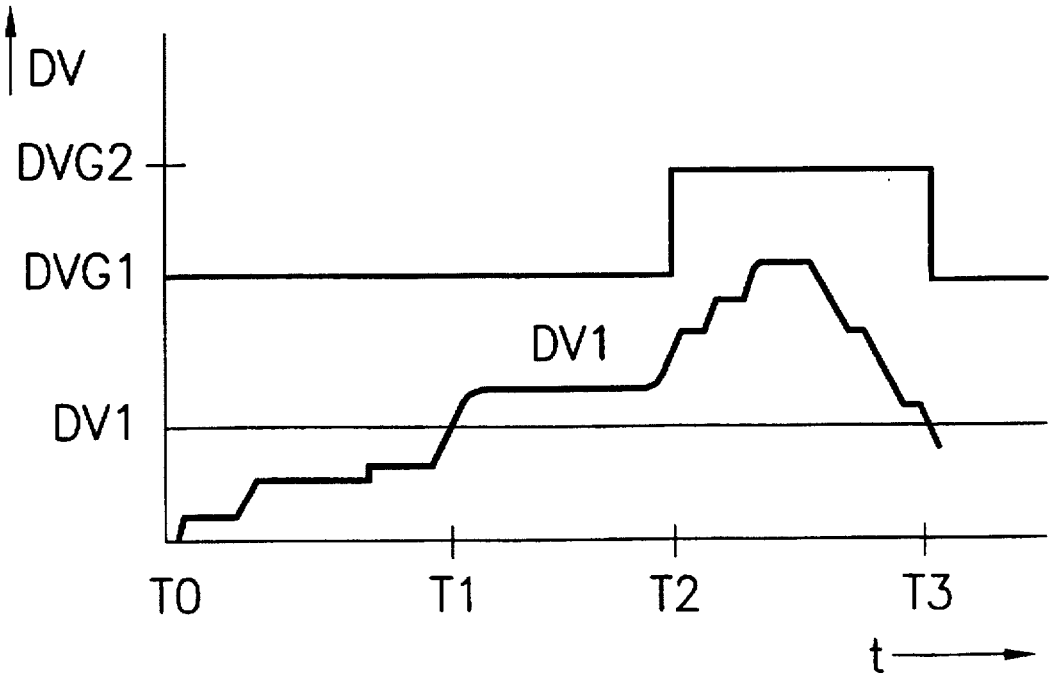
FIG. 8 illustrates another embodiment of the present invention for controlling a passenger restraint system in response to a non-collision impact situation, or a relatively slow occurring collision.

In FIG. 8, another embodiment of the method of the present invention is illustrated, wherein the passenger restraint system is released if the DV integration (DVI) reaches or exceeds an upper threshold DVG1. However, if the DV integration (DVI) does not reach the threshold DVG1 by time T2, which is measured from time T1, then the DV threshold is raised to a less sensitive value DVG2. Then, at time T3, when the DV integration (DVI) falls below the value DV1, the DV threshold (DVG) is again lowered to the DVG1 value. The release sensitivity of the passenger restraint system, therefore, is diminished during the period of time T2 to T3. The time interval T2–T3 can be set as desired, and can be controlled, for example, linearly as a function of time.

The method of the present invention illustrated in FIG. 8 is particularly advantageous in controlling the release of a passenger restraint system during relatively low level DV integrator responses which extend over a relatively long period of time, and which exceed a first DV threshold value (DV1) and indicate a continuous deceleration thereafter. However, if the deceleration is not significant enough to cause a release of the passenger restraint system, then the value of the DV threshold is raised to a less sensitive value (DVG2). This type of DV integrator response may be experienced, for example, when braking a vehicle on a slippery or bumpy road. Therefore, by employing the method of the present invention, a release of the passenger restraint system during such non-collision situations can be avoided.

Figure 9:
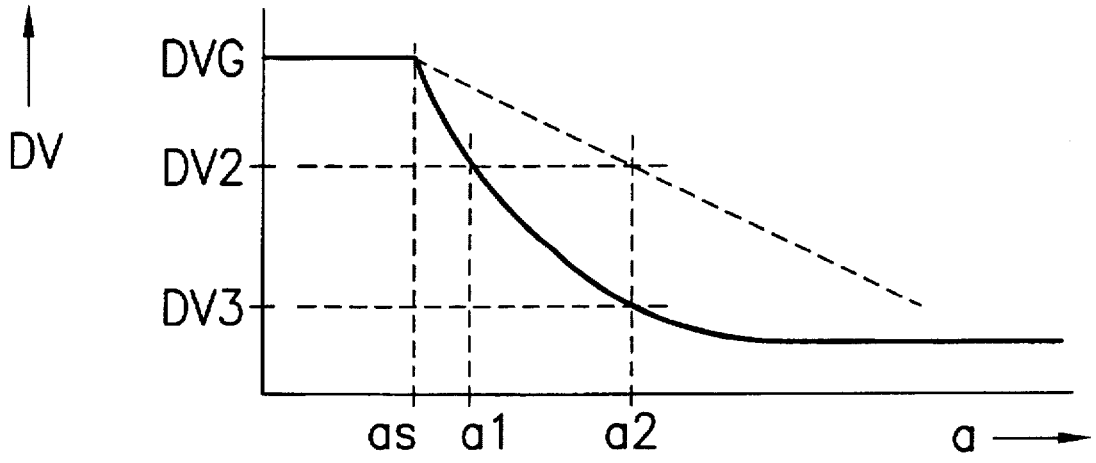
FIG. 9 illustrates two DV threshold curves determined as a function of the acceleration values generated typically by an acceleration sensor.
Figure 14:
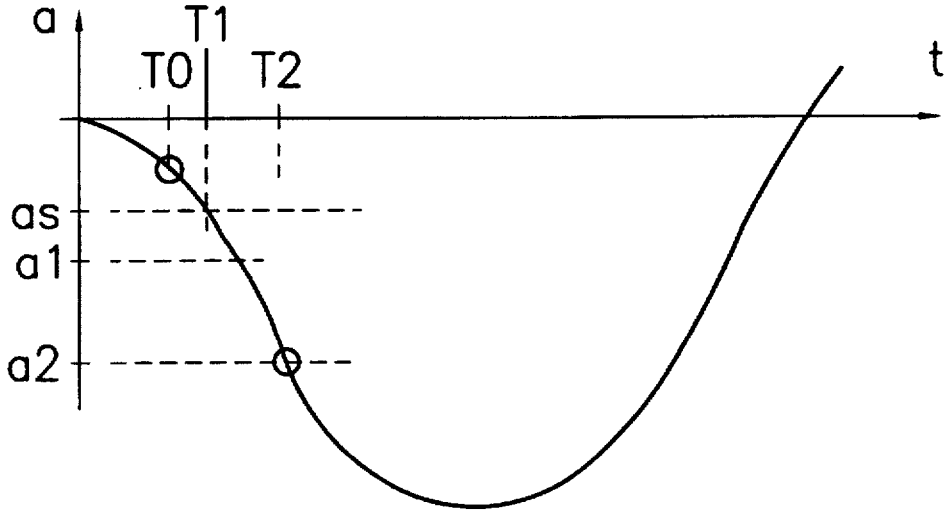
FIG. 14 illustrates a typical vehicle acceleration curve.

The method of the present invention illustrated in FIG. 8 is equally advantageous in relatively slow occurring collisions, when a release of the passenger restraint system, such as an air bag, may only further endanger the passengers if it is released too late. For example, release of an air bag would be useless, and might possibly further injure a passenger, if the passenger had already hit the steering wheel of the vehicle. Thus, by increasing the DV threshold to a less sensitive value (DVG2) after a relatively long and gradual period of deceleration, a delayed release of the passenger restraint system can be avoided which might only further endanger the passengers of the vehicle. Turning to FIGS. 9 and 14, a further embodiment of the method of the present invention is illustrated wherein the release behavior of a passenger restraint system is improved by controlling the value of the DV threshold (DVG) based on the values of the acceleration signals generated by an acceleration sensor. According to the method of the present invention, a given DV threshold value (DVG) is assigned to each acceleration value generated by an acceleration sensor. In FIG. 9, a DV threshold (DVG) curve is illustrated as a function of the acceleration values (A) generated typically by an acceleration sensor. In FIG. 14, a typical vehicle acceleration curve is illustrated wherein the values of the acceleration signals (A) generated by an acceleration sensor are plotted as a function of time. Thus, at time T1 the acceleration value is $A_s$, and at time T2 the acceleration value is $A_2$.

In FIG. 9, two possible alternatives of the method of the present invention are illustrated. The straight dashed line indicates that the DV threshold (DVG) is decreased linearly as a function of the acceleration value (A), beginning with the acceleration value $A_s$. Thus, when the acceleration value reaches the level $A_2$, the DV threshold (DVG) is decreased to the value DV2. Alternatively, the DV threshold (DVG) can be decreased as a non-linear function of the acceleration value (A), as indicated by the solid line in FIG. 9. Thus, in the non-linear embodiment, the lower DVG threshold (DV2) is reached at the acceleration value $A_1$, whereas in the linear embodiment, the DVG is substantially closer to its initial value maintained at the acceleration value $A_s$. Likewise, in the non-linear embodiment, when the acceleration value A2 is reached, an even lower DV threshold (DV3) is maintained, whereas in the linear embodiment, the higher DV threshold (DV2) is maintained.

Therefore, when relatively large acceleration values are generated, the DV threshold (DVG) is lowered to a more sensitive level as compared to the level maintained with lower acceleration values. Accordingly, a much faster release of the passenger restraint system can take place during faster occurring collisions. During slow occurring collisions, on the other hand, the acceleration values generally are relatively low and, accordingly, the DV threshold (DVG) is not significantly decreased. As a result, the release sensitivity of the passenger restraint system is increased during faster occurring collisions, in order to prevent the restraint system, such as an air bag, from releasing too late. Moreover, during slower occurring collisions, the air bag will likely not be prematurely released.

The acceleration-time curve illustrated in FIG. 14 is an ideal curve to the extent that it does not indicate fluctuations that might be caused, for example, by a pothole or bump in a road surface. Thus, in accordance with another embodiment of the present invention, a mean acceleration value is determined in order to avoid releasing the passenger restraint system in response to an acceleration signal generated by a pothole, bump, or other such non-collision impact condition. The subsequently generated acceleration signals are then compared to the mean acceleration value to determine whether the DV threshold (DVG) should be lowered, as illustrated, for example, in FIG. 9.

Figure 15:
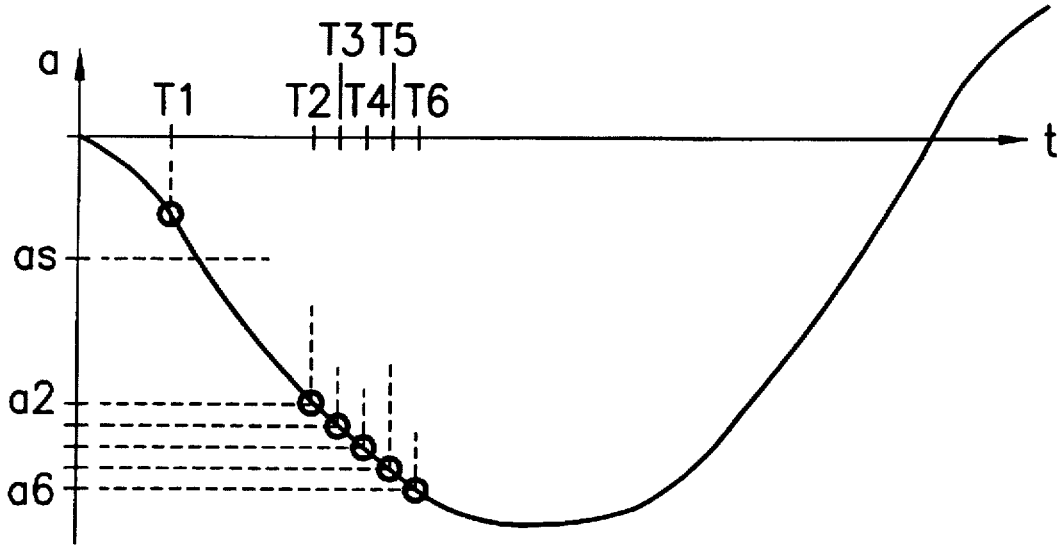
FIG. 15 illustrates another typical vehicle acceleration curve, wherein a mean acceleration value is determined pursuant to another embodiment of the present invention.

In FIG. 15 an acceleration-time curve is illustrated, wherein at time T1, a relatively low acceleration value is generated which does not require a lowering of the DV threshold (DVG). However, when the acceleration value falls below $A_2$, the DV threshold (DVG) should be decreased. Therefore, at sequential points in time T2 through T6, when the acceleration values are generated, a mean acceleration value is determined by adding each new acceleration value to the previously measured acceleration values, and dividing the sum by the number of measured values. The value of each subsequently generated acceleration signal (A) is then checked against the mean value. If the acceleration value does not fall within a predetermined deviation from the mean value, then the change in acceleration might be due to simply a poor road surface condition. Therefore, until the next acceleration value is generated, the DV threshold (DVG) is not lowered. However, if the acceleration signals continue to steadily decrease, then the change in acceleration is likely due to a collision condition requiring a drop in the DV threshold (DVG) value, in order to increase the release sensitivity of the passenger restraint system.

Figure 16:
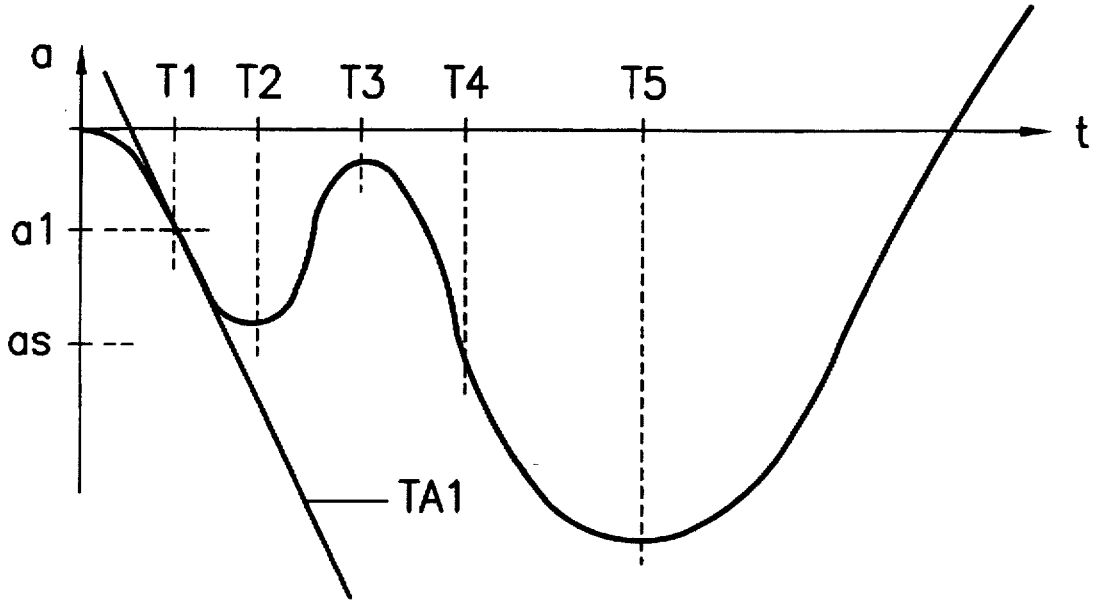
FIG. 16 illustrates a vehicle acceleration curve corresponding to a typical oblique impact collision, wherein the vehicle has energy-absorbing, collapsible zones.

In FIG. 16, another embodiment of the method of the present invention is illustrated, wherein the slope of the acceleration curve is used to determine whether to decrease the DV threshold value (DVG). The curve in FIG. 16 illustrates the acceleration values (A) that might typically be generated by an acceleration sensor during a collision by a vehicle having energy-absorbing, collapsible zones. As can be seen, at time T1, the acceleration curve only reaches an acceleration value $A_1$ but does not exceed the acceleration limit $A_s$, which is the threshold acceleration value necessary to release the passenger restraint system. Then, because of the energy absorbing zones of the vehicle, at time T3 the acceleration value increases above the value $A_s$. Only at time $T_4$ does the acceleration value decrease again and reach the limit $A_s$. Thus, if the release of the passenger restraint system were based only on the amplitudes of the acceleration values, the system would likely not be released until time T4. Therefore, because the acceleration signals are affected by the collapsible zones of the vehicle, a relatively dangerous collision situation would not be detected by the passenger restraint system in time. As a result, the lowering of the DV threshold (DVG) to a more sensitive reaction level in order to quickly release the passenger restraint system, could likely not be achieved.

The method of the present invention solves this problem by controlling the DV threshold (DVG) value as a function of the slope of the acceleration curve. As shown in FIG. 16, the slope of the acceleration curve at time T1 is indicated by the line TAI drawn tangent to the curve. Although at time T1, the amplitude of the acceleration (A1) would likely not be sufficient to indicate that the DV threshold (DVG) value should be decreased, the slope of the line TA1 indicates that there is a dangerous collision [situatio] *situation*, and that the passenger restraint system should be rapidly activated. Therefore, based on the slope of the line TA1, the DV threshold (DVG) is decreased to a more sensitive level (DV2), as indicated for example by the solid line curve in FIG. 9. The slope of the acceleration curve can be determined, for example, based on two successive acceleration signals, in a manner known to those skilled in the art. Then, if the slope exceeds a threshold value, the DV threshold (DVG) is adjusted accordingly, so as to increase the release sensitivity of the passenger restraint system.

It should also be noted that the reaction behavior of a passenger restraint system can be further improved by performing a frequency analysis on the acceleration curve. Based on the frequency analysis, it is possible to recognize and suppress natural oscillations in an acceleration transducer system. It is also possible to recognize noise oscillations with relatively high amplitude values, which are not caused by collision situations, such as the impact stress of a vehicle driving over a rocky surface, a bump, or a pothole. Likewise, a pattern recognition can be compared to a stored ideal pattern in order to determine whether an actual collision situation is occurring.

Moreover, output signals generated by additional acceleration sensors located in different locations on a vehicle can also be analyzed to determine whether to lower the DV threshold (DVG). For example, switching signals generated by a rear axle switch, the seatbelt locks, the seat contacts, the brake switch, a gear switch, a contact switch, or a mechanical acceleration switch, can be generated and combined with the output signal of a central acceleration sensor, in order to determine whether, and how to decrease the DV threshold (DVG) for a particular vehicle. Moreover, signals generated by other control devices, such as brake regulators, the engine control system, or the navigation system of a vehicle, can also be evaluated.

Figure 10:
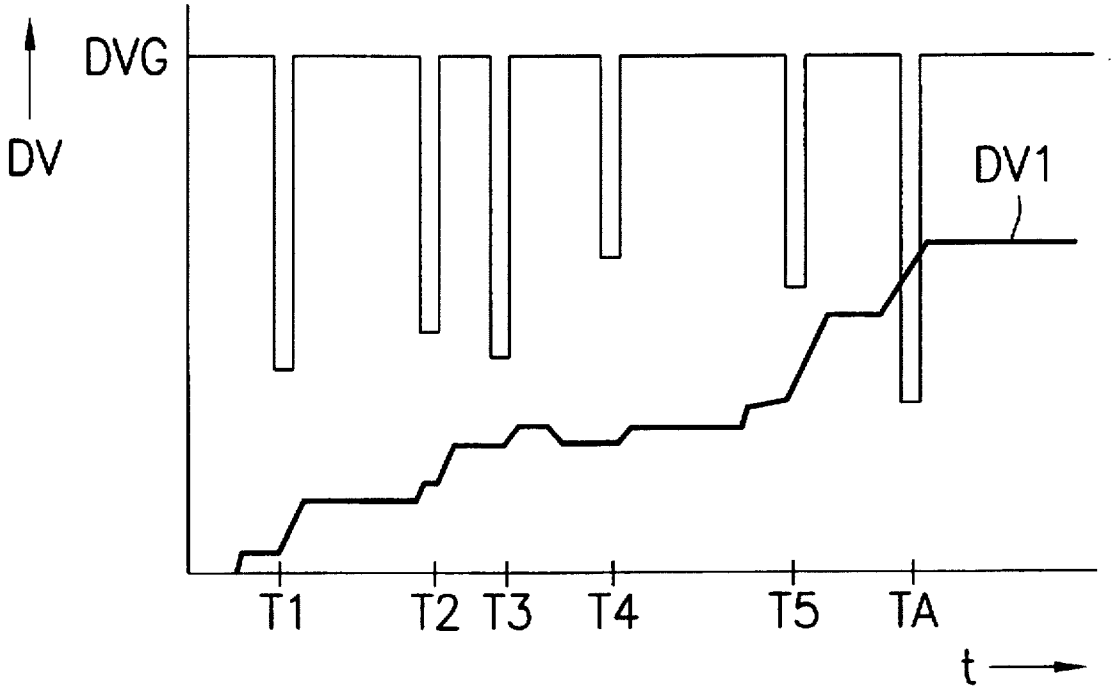
FIG. 10 illustrates another embodiment of the present invention for controlling a passenger restraint system in response to a typical oblique impact collision.

In FIG. 10, another embodiment of the method of the present invention is illustrated, wherein the DVI curve corresponds to another typical oblique impact collision. At each point in time T1, T2, T3, T4, T5, and TA, when the DVI increases in value, the DV threshold (DVG) is lowered from its relatively high initial value, in order to increase the release sensitivity of the passenger restraint system. However, immediately after each point in time, when the value of the DVI levels off or maintains a constant value until the next point in time, the DVG immediately returns to its initially relatively high value. Then, at time TA, when the DVI exceeds the lowered DVG value, the passenger restraint system is activated.

Figure 11:
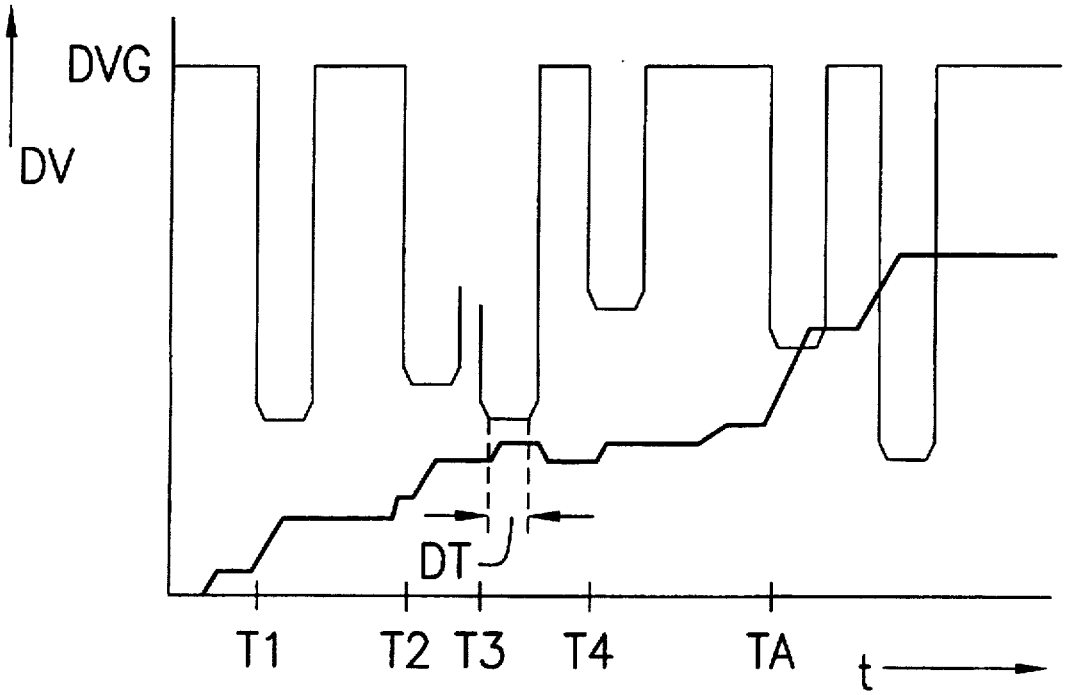
FIG. 11 illustrates another embodiment of the present invention for controlling a passenger restraint system in response to a typical oblique impact collision.

In FIG. 11, another embodiment of the method of the present invention is illustrated. Like the embodiment described above with reference to FIG. 10, when the DVI increases at times T1, T2, T3, T4, and TA, the DV threshold (DVG) is lowered to a more sensitive level. Then, when the DVI levels off or maintains a constant value after each point in time, the DV threshold (DVG) is raised back to its original level, but only after a time delay (DT). Thus, the DVG curve is phase shifted with respect to the DVI curve by the time delay DT. By delaying the return of the DVG to its initial relatively high level, the restraint system can be released more rapidly when the deceleration maintains a constant value for only a short moment, and then inoreases again, as shown in FIG. 11. Therefore, immediately after time TA and during the time delay DT, when the DVI reaches the lower DVG threshold, the passenger restraint system is rapidly released. If, on the other hand, at time TA the DV threshold is not delayed in returning to its initially high value, but is immediately raised to that value, the passenger restraint system would not be as quickly released.

Figure 12:
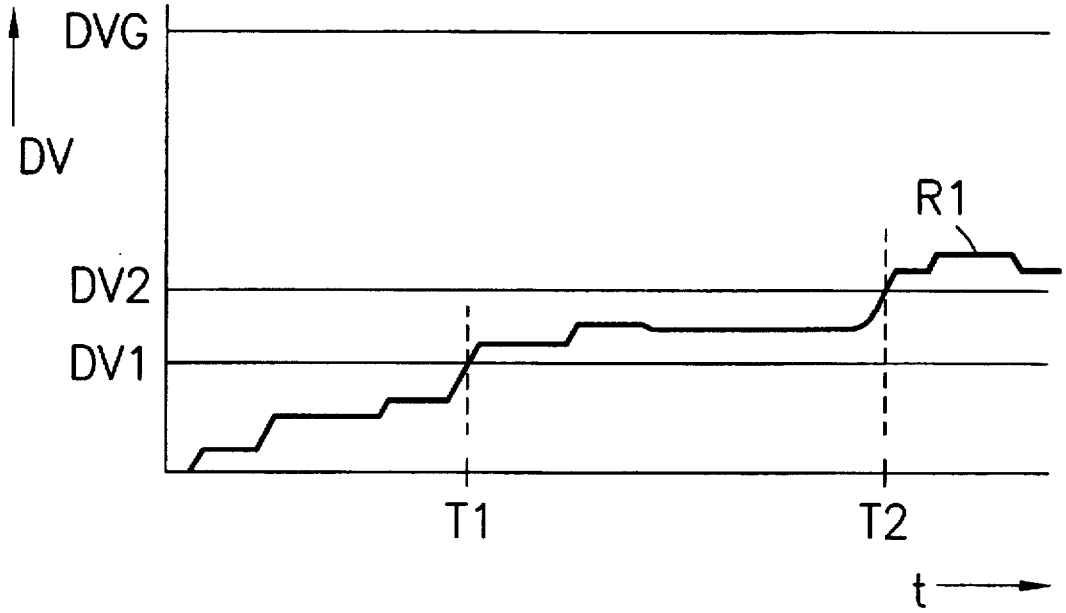
FIG. 12 illustrates a reference integration curve corresponding to the acceleration of a vehicle during a typical oblique, impact collision.
Figure 13:
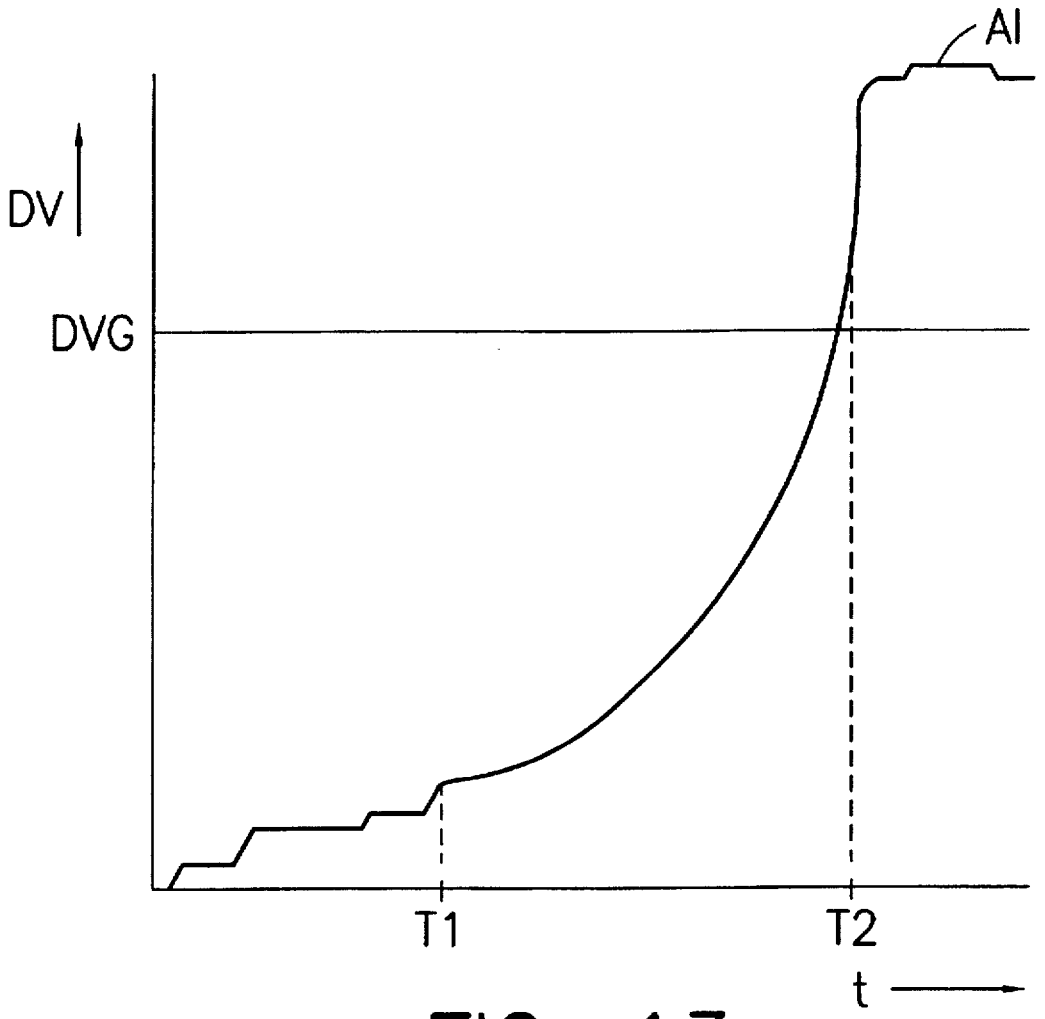
FIG. 13 illustrates a typical release integration curve for controlling a passenger restraint system in response to a typical oblique impact collision pursuant to another embodiment of the present invention.

In FIGS. 12 and 13, another embodiment of the method of the present invention is illustrated. In FIG. 12, the integrator range DV1–DV2 is maintained at a constant value, and the integration values (RI) of a reference integrator are illustrated. FIG. 13, on the other hand, illustrates the integration values of a release integrator (AI).

In FIG. 12, the reference integration (RI) reaches the lower threshold DV1 at time T1, and then increases within the integrator range DV1–DV2 until time T2, when it reaches and thereafter exceeds the upper threshold DV2. In FIG. 13, the value of the release integration (AI) is determined as a function of the value of the reference integration (RI) illustrated in FIG. 12. Therefore, after time T1, when the reference integration (RI) reaches the value DV1, the output signals generated by the acceleration sensor are adjusted based on a factor corresponding to the time elapsed since time T1. The adjusted acceleration values are then integrated by the release integrator to achieve the release integration values (AI) shown in FIG. 13. Thus, at time T2, when the reference integration (RI) exceeds the upper threshold DV2, as shown in FIG. 12, the release integration (AI) in FIG. 13, which is based on the value of the reference integration (RI), exceeds the DV threshold (DVG) and, therefore, the passenger restraint system is released.

As can be seen, the release integration values (AI) are substantially influenced when the DV reference integration (RI) is within the integrator range DV1–DV2, as illustrated in FIG. 12. The release integration values (AI) are obtained by multiplying the acceleration values by a factor proportional to the amount of time elapsed since time T1, when the reference integration (RI) reached the lower threshold DV1. The release integration values (AI) may likewise be obtained by adding a set value to the acceleration values.

Therefore, when the reference integration (RI) is maintained within the integrator range DV1–DV2 for a relatively long period of time (T1–T2), the value of the release integration (AI) is increased rapidly. The reference integration curve (RI) illustrated in FIG. 12, is typical of integration values experienced during oblique collisions, for example, a collision occurring at about 30° with respect to the longitudinal axis of a vehicle. Such collisions are frequently encountered in traffic accidents, offset crashes, pole crashes, etc. Accordingly, the release threshold (DVG) is reached rapidly and thus the passenger restraint system can be released quickly during a collision to effectively protect the passengers. It should be noted that the reference integration curve (RI) is different for oblique collisions as opposed to direct front end or direct rear end collisions. Therefore, a different integrator range DV1–DV2 would be employed for a front end or rear end collision. Accordingly, the release sensitivity of the passenger restraint system can be varied depending upon the type of collision.

In a further embodiment of the method of the present invention, a time interval is initiated when the reference integration value (RI) exceeds a lower threshold, for example, DVI in FIG. 12. Control of the DV threshold (DVG) value is then determined based on the length of the time interval. Depending upon the length of the time interval, the DV threshold (DVG) is lowered accordingly. A counting circuit can be used, for example, to initiate the time interval. The counting circuit can be reset each time the reference integration (RI) falls below the lower threshold (DV1). Furthermore, the DV threshold (DVG) can be controlled depending upon the amplitude of the acceleration values, as described above. As a result, it is possible to suppress fluctuations in the acceleration signals generated by an acceleration sensor, that might be the result of noise or vibrations on the sensor that are not caused by a collision. Noise vibrations may occur, for example, by a hammer hitting the vehicle's chassis, rocks hitting the bottom of the vehicle, or when the vehicle drives over railroad tracks.

Therefore, an inappropriate release of the passenger restraint system is avoided by employing the method of the present invention, without diminishing the sensitivity of the passenger restraint system in responding to oblique collisions. Acceleration signals stemming from such non-collision impact stresses characteristically start with a very high amplitude value and then fall very rapidly to a comparatively low value. Therefore, by delaying a decrease in the DV threshold (DVG) by a time interval, in response to changes in the acceleration values, a premature release of the passenger restraint system in response to a non-collision impact can be avoided.

Figure 17:
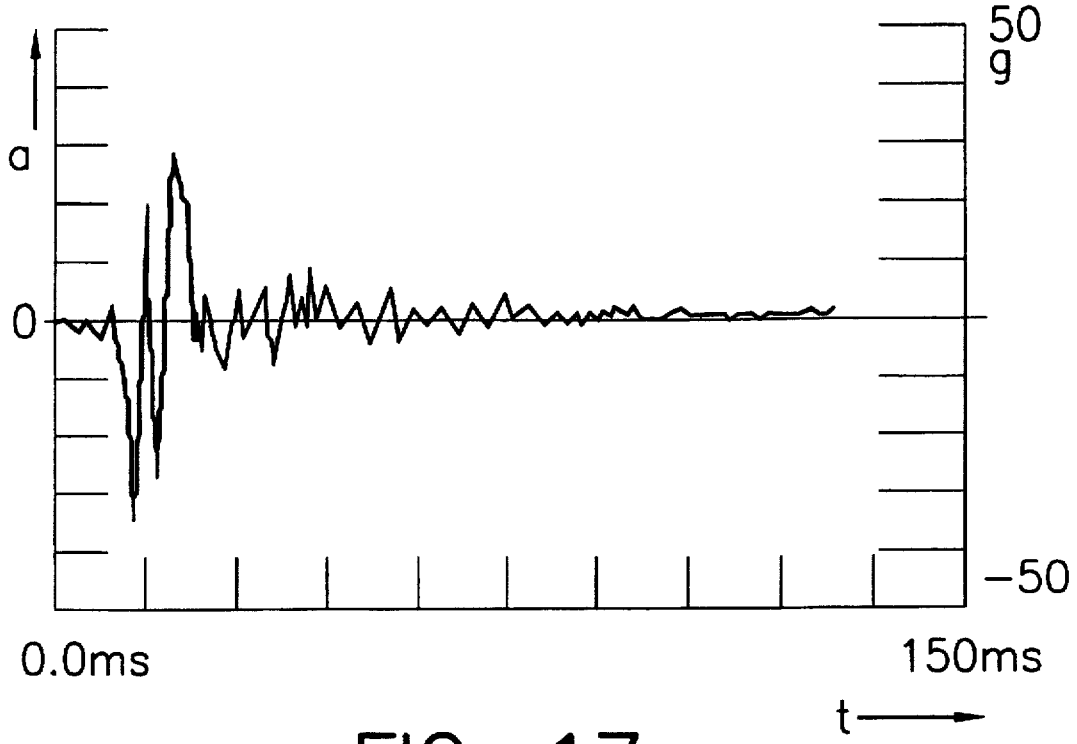
FIG. 17 illustrates a typical acceleration curve of a vehicle crossing railroad tracks.

FIG. 17 illustrates an accelertion curve corresponding to typical acceleration values generated by an acceleration sensor when a vehicle crosses railroad tracks. As can be seen, the curve corresponds to a bipolar type signal, wherein there is an initially very high amplitude of approximately 30 g, which then diminishes very rapidly. After approximately 30 ms, the amplitude values are again very low.

Figure 18:
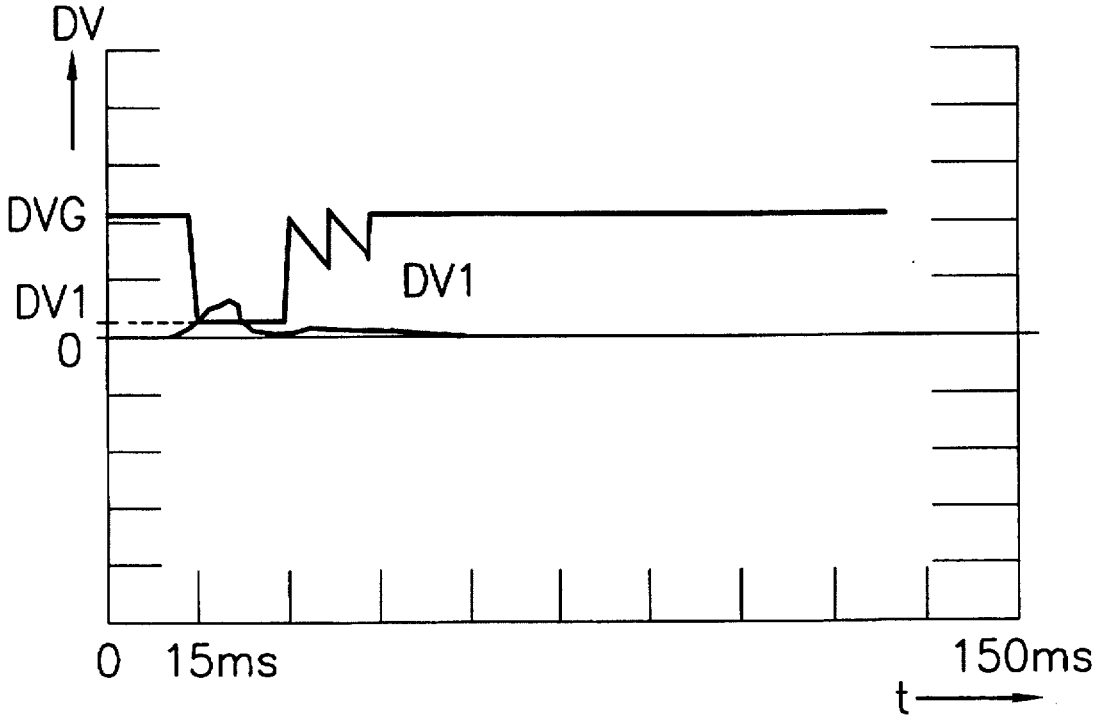
FIG. 18 illustrates a DV integration curve corresponding to a typical non-collision type of impact.

In FIG. 18, a DVI curve corresponding to a typical non-collision type of impact is illustrated. The DV threshold (DVG) is controlled as a complex function of time. Thus, at time T0, the DVG is maintained at a relatively high constant value, but is then lowered to the value DVI to increase the sensitivity of the passenger restraint system after about 15 ms. The DVG is maintained at the value DV1 for about 15 ms, and is then momentarily raised again to its initial value (DVG). Thereafter, the DVG is decreased linearly for about 7.5 ms, momentarily increased to its initial value, decreased linearly again for about 7.5 ms, and then increased and maintained at its initial value (DVG) thereafter. As can be seen, the DVG follows a sawtooth type curve for about 15 ms. However, after about 13.5 ms, the DVI exceeds the lower threshold DV1. As a result, the passenger restraint system would be released during a non-collision situation, possibly endangering the passengers in the vehicle.

Figure 19:
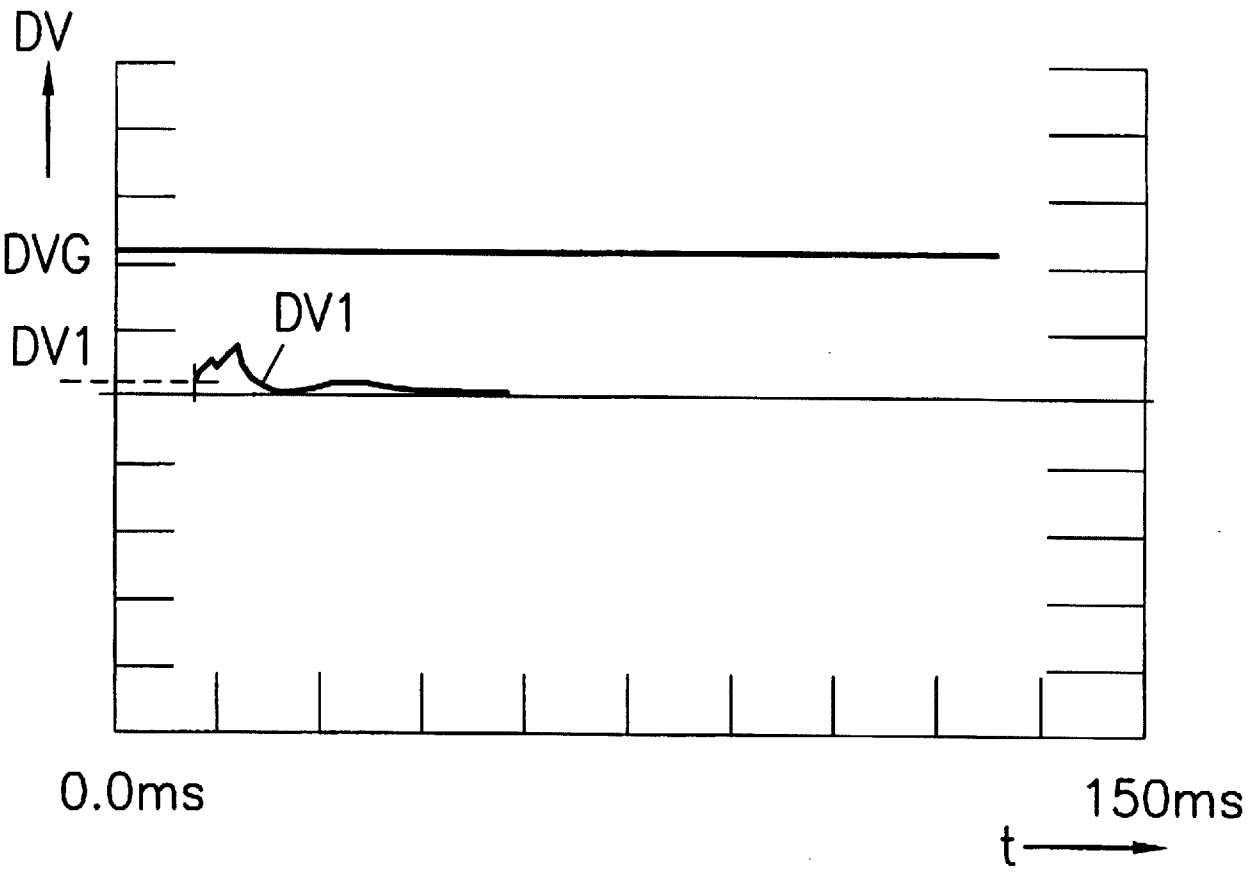
FIG. 19 illustrates another embodiment of the present invention for controlling a passenger restraint system in response to a typical non-collision type of impact.

In FIG. 19, a DVI curve corresponding to a non-collision situation, which is similar to the curve in FIG. 18, is illustrated with reference to another embodiment of the present invention. As can be seen, the DV threshold (DVG) is not lowered to the value DVI, as shown in FIG. 18, but is maintained at its initial value (DVG) throughout the occurrence. In accordance with the method of the present invention, a counting circuit is initiated at the beginning of the occurrence, which is about 13.5 ms after time 0. Here, the counting circuit is set to run for a minimum time of about 25 ms. Therefore, although the DVI would exceed the DVG if it were decreased to the lower threshold DV1, the DVG cannot be decreased until after the 25 ms time interval. As a result, because the change in DVI is due to a non-collision type of impact, after the 25 ms time interval, the DVI again falls below the lower threshold DV1, and thus does not give rise to a decrease in the DVG value. Accordingly, because of the time delay, the passenger restraint system is not be prematurely released by a non-collision type of impact on the vehicle.

Figure 20:
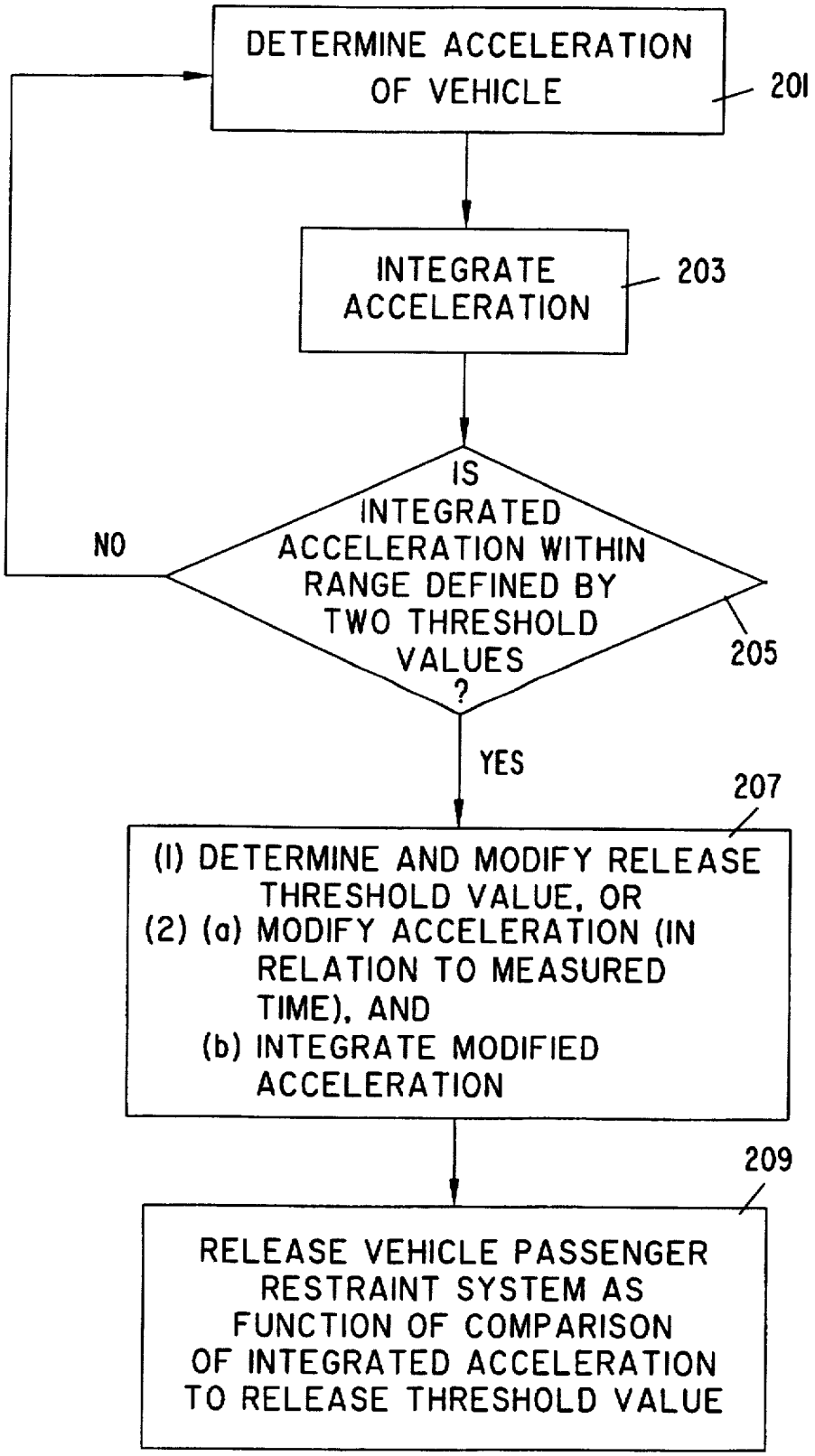
*FIG. 20 is a flow chart illustrating an exemplary embodiment of the method according to the present invention.*

*FIG. 20 is a flow chart illustrating an exemplary embodiment of the method according to the present invention. In particular, in step 201, the acceleration of the vehicle is determined. In step 203, the acceleration is integrated. In step 205, it is determined whether the integrated acceleration is within the range defined by two threshold values. If it is not, step 201 follows. If it is, the release threshold value is determined and modified, or the acceleration is modified (in relation to a measured time) and then integrated, in step 207. In step 209, the passenger restraint system of the vehicle is released as a function of a comparison of the integrated acceleration to the release threshold value.*

What is claimed is:

[1. A method of controlling the release of a passenger restraint system in a vehicle comprising the following steps:

generating a first signal indicative of the acceleration of the vehicle, integrating the first signal with respect to time to generate a second signal indicative of the velocity of the vehicle, determining a first threshold value and adjusting the first threshold value based on the value of the first signal, and comparing the value of the second signal to the first threshold value and releasing the passenger restraint system if the value of the second signal exceeds the first threshold value.]

[2. A method as defined in claim 1, wherein the first threshold value is decreased in response to an increase in the value of the second signal.]

[3. A method as defined in claim 1 further comprising the following step:

determining a second threshold value and decreasing the first threshold value about when the value of the second signal reaches or exceeds the second threshold value.]

[4. A method as defined in claim 3, wherein the first threshold value is decreased as a linear function of time.]

5. [A method as defined in claim 4 further comprising the following step:] *A method of controlling the release of a passenger restraint system in a vehicle comprising the following steps:*

*generating a first signal indicative of the acceleration of the vehicle,*

*integrating the first signal with respect to time to generate a second signal indicative of the velocity of the vehicle,*

*determining a first threshold value and adjusting the first threshold value based on the value of the first signal,*

*comparing the value of the second signal to the first threshold value and releasing the passenger restraint system if the value of the second signal exceeds the first threshold value,*

*determining a second threshold value and decreasing the first threshold value, as a linear function of time, about when the value of the second signal reaches or exceeds the second threshold value, and* determining a third threshold value which is greater than the second threshold value, thus defining a range between the second and third threshold values, and when the value of the second signal reaches the third threshold value, maintaining the first threshold value at a minimum value.

6. A method as defined in claim 5, wherein the third threshold value is increased linearly as a function of time about when the value of the second signal reaches the second threshold value.

7. A method as defined in claim 5, wherein the third threshold value is maintained at a constant value over time.

8. A method as defined in claim 6, wherein about when the value of the second signal reaches the second threshold value, the first threshold value is decreased as a non-linear function of time and is then maintained at a constant minimum value approximately when the value of the second signal reaches the third threshold value.

9. A method as defined in claim 8, wherein about when the value of the second signal reaches the second threshold value, the second threshold value is increased linearly as a function of time.

10. [A method as defined in claim 1 further comprising the following steps:] *A method of controlling the release of a passenger restraint system in a vehicle comprising the following steps:*

*generating a first signal indicative of the acceleration of the vehicle,*

*integrating the first signal with respect to time to generate a second signal indicative of the velocity of the vehicle,*

*determining a first threshold value and adjusting the first threshold value based on the value of the first signal,*

*comparing the value of the second signal to the first threshold value and releasing the passenger restraint system if the value of the second signal exceeds the first threshold value,* determining a second threshold value which is less than the first threshold value, and maintaining the second threshold value constant as a function of time, [and]

about when the value of the second signal reaches the second threshold value, maintaining the first threshold value at a constant value, and measuring a first time interval from about when the value of the second signal reaches the second threshold value, and if the value of the second signal does not reach the first threshold value within the first time interval, increasing the first threshold value to a higher value.

11. A method as defined in claim 10, wherein if the value of the second signal then decreases back to the second threshold value, the first threshold value is decreased to its initial lower value.

[12. A method as defined in claim 1, wherein when the value of the second signal increases, the first threshold value is decreased to a lower value for a first time interval and at the end of the first time interval, the first threshold value is increased to its initial higher value.]

[13. A method as defined in claim 12, wherein the first threshold value is decreased to a greater degree for larger increases in the value of the second signal per unit of time.]

[14. A method as defined in claim 1 further comprising the following steps:

determining the slope of a curve corresponding to the values of at least two first signals plotted with respect to time, and controlling the value of the first threshold value based on the slope of the curve.]

15. [A method as defined in claim 1 further comprising the following steps:] *A method of controlling the release of a passenger restraint system in a vehicle comprising the following steps:*

*generating a first signal indicative of the acceleration of the vehicle,*

*integrating the first signal with respect to time to generate a second signal indicative of the velocity of the vehicle,*

*determining a first threshold value and adjusting the first threshold value based on the value of the first signal,*

*comparing the value of the second signal to the first threshold value and releasing the passenger restraint system if the value of the second signal exceeds the first threshold value,* measuring a second time interval when the value of the second signal increases, maintaining the first threshold value constant during the second time interval, and decreasing the first threshold value at the end of the second time interval if the value of the second signal is greater than it was prior to the initiation of the second time interval.

16. A method of controlling the release of a passenger restraint system in a vehicle comprising the following steps:

generating a first reference signal indicative of the acceleration of the vehicle, integrating the first reference signal with respect to time to generate a second reference signal indicative of the velocity of the vehicle, comparing the second reference signal to a lower [reerence] *reference* threshold value and to an upper reference threshold value, the lower and upper reference threshold values defining a reference integrator range therebetween, approximately when the value of the second reference signal reaches the lower reference threshold value, measuring the time elapsed while the value of the second reference signal is within the reference integrator range, generating a first release signal indicative of the acceleration of the vehicle, adjusting the first release signal based on the measured time elapsed while the value of the second reference signal is within the reference integrator range, integrating the adjusted first release signal with respect to time to obtain a second release signal, and comparing the value of the second release signal to a release threshold value, and releasing the passenger restraint system if the value of the second release signal equals or exceeds the release threshold value.

17. A method as defined in claim 16, wherein the first release signal is increased as a function of time when the value of the second reference signal is within the reference integrator range.

18. A method as defined in claim 16, wherein the value of the second release signal increases exponentially as a function of time.

19. A method as defined in claim 18, wherein the value of the second release signal equals or exceeds the release threshold value approximately when the value of the second reference signal equals or exceeds the upper reference threshold value, thus causing a release of the passenger restraint system.

[20. A method for controlling the release of a passenger restraint system in a vehicle, said method comprising the following steps:

generating a first signal corresponding to the acceleration of the vehicle, generating a second signal by integrating said first signal with respect to time, said second signal corresponding to the velocity of the vehicle, determining a release threshold value in response to said first signal, and releasing the passenger restraint system when said second signal's value is about equal to said release threshold value.]

[21. A method as defined in claim 20, said method further comprising the following steps:

determining a lower threshold value, and decreasing said release threshold value as a function of time about when said second signal's value equals or exceeds said lower threshold value.]

22. [A method as defined in claim 21, said method further comprising the following steps:] *A method for controlling the release of a passenger restraint system in a vehicle, said method comprising the following steps:*

*generating a first signal corresponding to the acceleration of the vehicle,*

*generating a second signal by integrating said first signal with respect to time, said second signal corresponding to the velocity of the vehicle,*

*determining a release threshold value in response to said first signal,*

*releasing the passenger restraint system when said second signal's value is about equal to said release threshold value,*

*determining a lower threshold value,*

*decreasing said release threshold value as a function of time about when said second signal's value equals or exceeds said lower threshold value,* determining an upper threshold value, said lower and upper threshold values defining a range therebetween, and when said second signal's value equals or exceeds said upper threshold value, maintaining said release threshold value at a constant value.

23. A method as defined in claim 22, wherein said release threshold value is decreased linearly as a function of time.

24. A method as defined in claim 23, wherein said upper threshold value is increased when said second signal's value reaches said lower threshold value.

25. A method as defined in claim 24, wherein said upper threshold value is increased linearly as a function of time.

[26. A method as defined in claim 21, wherein said release threshold value is decreased as a function of time and as a function of the value of said second signal.]

27. A method as defined in claim 22, wherein said release threshold value is decreased as a non-linear function of time, and said upper threshold value is increased as a linear function of time approximately when said second signal's value equals or exceeds said lower threshold value.

28. A method as defined in claim 27, said method further comprising the following step:

increasing said lower threshold value as a linear function of time about when said second signal's value equals said lower threshold value.

29. [A method as defined in claim 20, said method further comprising the following steps:] *A method for controlling the release of a passenger restraint system in a vehicle, said method comprising the following steps:*

*generating a first signal corresponding to the acceleration of the vehicle,*

*generating a second signal by integrating said first signal with respect to time, said second signal corresponding to the velocity of the vehicle,*

*determining a release threshold value in response to said first signal,*

*releasing the passenger restraint system when said second signal's value is about equal to said release threshold value,* determining a lower threshold value, measuring a first time interval about when said second signal's value equals or exceeds said lower threshold value, and if at the end of said first time interval said second signal's value is greater than or equal to said lower threshold value, but less than said release threshold value, increasing said release threshold value to a higher value.

30. A method as defined in claim 29, wherein after said first time interval, if said second signal's value falls below said lower threshold value, said release threshold value is lowered to its initial value.

[31. A method as defined in claim 20, wherein said release threshold value is lowered in response to an increase in the value of said second signal.]

[32. A method as defined in claim 31, wherein said release threshold value is maintained at the lower value for a second time interval, and at the end of said second time interval, said release threshold value is raised to its initially higher value.]

33. [A method as defined in claim 20 further comprising the following steps:] *A method for controlling the release of a passenger restraint system in a vehicle, said method comprising the following steps:*

*generating a first signal corresponding to the acceleration of the vehicle,*

*generating a second signal by integrating said first signal with respect to time, said second signal corresponding to the velocity of the vehicle,*

*determining a release threshold value in response to said first signal,*

*releasing the passenger restraint system when said second signal's value is about equal to said release threshold value, and* determining a mean value based on a plurality of said first signals, and comparing one of said first signals generated thereafter to said mean value.

34. A method as defined in claim 33, wherein said release threshold value is maintained at a constant value until the next of said first signals is generated, when said first signal does not fall within a predetermined deviation from said mean value.

35. A method for controlling the release of an air bag in a motor vehicle comprising the following steps:

generating an acceleration signal with an acceleration sensor mounted on the vehicle, integrating the acceleration signal with respect to time to obtain an integrated acceleration signal or velocity signal, determining a release threshold value, determining a lower threshold value which is less than the release threshold value, determining an upper threshold value which is greater than the lower threshold value, thus defining a range therebetween, decreasing the release threshold value approximately when the velocity signal equals the lower threshold value, and releasing the air bag approximately when the velocity signal equals the release threshold value.

36. A method as defined in claim 35, wherein the release threshold value is decreased as a linear function of time and is then maintained at a constant minimum value approximately when the velocity signal equals the upper threshold value.

37. A method as defined in claim 36, wherein the upper threshold value is increased linearly as a function of time approximately when the velocity signal equals the lower threshold value.

38. A method as defined in claim 35, wherein the release threshold value is decreased as a nonlinear function of time and is then maintained at a constant minimum value approximately when the velocity signal equals the upper threshold value, and the upper threshold value is increased as a linear function of time approximately when the velocity signal equals the lower threshold value.

[39. A method of controlling the release of an air bag in a motor vehicle comprising the following steps:

measuring a first signal representative of the acceleration of the vehicle, integrating the first signal with respect to time to obtain a second signal, comparing the second signal to a lower threshold value, decreasing a release threshold value approximately when the value of the second signal equals the lower threshold value, the release threshold value being greater than the lower threshold value, and releasing the air bag approximately when the second signal's value equals the release threshold value.]

40. [A method as defined in claim 39 further comprising the following steps:] *A method of controlling the release of an air bag in a motor vehicle comprising the following steps:*

*measuring a first signal representative of the acceleration of the vehicle,*

*integrating the first signal with respect to time to obtain a second signal,*

*comparing the second signal to a lower threshold value,*

*decreasing a release threshold value approximately when the value of the second signal equals the lower threshold value, the release threshold value being greater than the lower threshold value, and releasing the air bag approximately when the second signal's value equals the release threshold value,* comparing the second signal to an upper threshold value which is greater than the lower threshold value, and maintaining the release threshold value at a minimum constant value approximately when the second signal's value equals the upper threshold value.

41. A method as defined in claim 40, wherein the release threshold value is decreased as a function of time and as a function of the second signal's value.

42. A method as defined in claim 41, wherein the release threshold value is decreased more rapidly for greater increases in the second signal's value per unit of time.

43. A method as defined in claim 40, wherein the release threshold value is decreased as a linear function of time, and the upper threshold value is increased as a linear function of time approximately when the second signal's value equals the lower threshold value.

44. A method as defined in claim 40, wherein the release threshold value is decreased as a nonlinear function of time, and the upper threshold value is increased as a linear function of time approximately when the second signal's value equals the lower threshold value.

*45. A method for controlling the release of a passenger restraint system in a vehicle, comprising the following steps:*

*generating a first signal corresponding to an acceleration of the vehicle;*

*determining a value in response to the first signal;*

*comparing the value to a first predetermined threshold value;*

*adjusting the first signal as a function of the comparison of the value to the first predetermined threshold value;*

*integrating the first signal with respect to time to generate a second signal corresponding to a velocity of the vehicle;*

*comparing the second signal's value to a second predetermined threshold value; and*

*releasing the passenger restraint system as a function of the comparison of the second signal's value to the second predetermined threshold value.*

*46. The method according to claim 45, wherein the adjusting step is performed prior to the integrating step.*

*47. The method according to claim 45, wherein the adjusting step includes the step of increasing an amplitude of the first signal as a function of a predetermined factor.*

*48. The method according to claim 45, wherein the adjusting step includes the step of multiplying the first signal by a predetermined factor.*

*49. The method according to claim 45, wherein the adjusting step includes the step of adding a predetermined factor to the first signal.*

*50. The method according to claim 45, further comprising the step of modifying the first signal as a function of time.*

*51. The method according to claim 45, further comprising the step of multiplying the first signal by a predetermined function of time.*

*52. The method according to claim 45, wherein the passenger restraint system is released if the second signal's value is at least as large as the second predetermined threshold value.*

*53. The method according to claim 45, wherein the second signal's value and the second predetermined threshold value define a difference between the second signal's value and the second predetermined threshold value, and further comprising the step of decreasing the difference between the second signal's value and the second predetermined threshold value.*

*54. The method according to claim 45, wherein the second predetermined threshold value is a constant value.*

*55. The method according to claim 45, wherein the value determined in response to the first signal is a velocity value.*

*56. The method according to claim 45, wherein the value determined in response to the first signal is indicative of motion of the vehicle.*

*57. A method for controlling the release of a passenger restraint system in a vehicle, comprising the following steps:*

*generating a first signal corresponding to an acceleration of the vehicle;*

*modifying the first signal in relation to a measured time;*

*integrating the first signal with respect to time to generate a second signal corresponding to a velocity of the vehicle;*

*comparing the second signal's value to a predetermined release threshold value; and*

*releasing the passenger restraint system as a function of the comparison.*

*58. The method according to claim 57, wherein the modification is performed through multiplication.*

*59. The method according to claim 57, wherein the modification is performed through addition.*

*60. The method according to claim 57, wherein the modifying step includes the step of increasing an amplitude of the first signal.*

*61. The method according to claim 57, wherein the modifying step is performed prior to the integrating step.*

* * * * *